United States Patent
Feria et al.

(10) Patent No.: US 10,064,070 B2
(45) Date of Patent: Aug. 28, 2018

(54) SYSTEM AND METHOD FOR MAINTAINING COMMUNICATIONS OVER A COVERAGE AREA

(71) Applicant: The Boeing Company, Chicago, IL (US)

(72) Inventors: Ying J. Feria, Manhattan Beach, CA (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 15/137,732

(22) Filed: Apr. 25, 2016

(65) Prior Publication Data

US 2017/0311178 A1 Oct. 26, 2017

(51) Int. Cl.
*H04W 4/00* (2018.01)
*H04W 16/28* (2009.01)
*H04B 7/185* (2006.01)

(52) U.S. Cl.
CPC ........ *H04W 16/28* (2013.01); *H04B 7/18504* (2013.01); *H04B 7/18506* (2013.01)

(58) Field of Classification Search
CPC ........................... H04W 16/28; H04B 7/18506
USPC ........................................................ 370/329
See application file for complete search history.

(56) References Cited

U.S. PATENT DOCUMENTS

| | | |
|---|---|---|
| 6,856,803 B1 | 2/2005 | Gross et al. |
| 6,993,288 B2 | 1/2006 | de La Chapelle et al. |
| 7,020,463 B2 | 3/2006 | Bybee et al. |
| 8,180,341 B2 | 5/2012 | Hibbs et al. |
| 8,948,747 B2 | 2/2015 | Feria et al. |
| 2014/0228036 A1 | 8/2014 | Feria et al. |
| 2016/0112116 A1 | 4/2016 | Jalali et al. |

OTHER PUBLICATIONS

European Patent Office, Extended European Search Report, EP 17 16 7990 (dated Sep. 27, 2017).

*Primary Examiner* — Sai Ming Chan
(74) *Attorney, Agent, or Firm* — Walters & Wesylyna LLC

(57) ABSTRACT

A communications system includes radio frequency equipment configured to generate RF beams from a high altitude communications platform providing communications coverage over a coverage area, a beamformer configured to apply beam weights to the RF beams to divide the coverage area into service areas arranged in a frequency reuse ground pattern, and a processor configured to adjust the beam weights to compensate for beam displacements resulting from motion of the high altitude communications platform along a flight path, and interchange the RF beams to maintain the frequency reuse ground pattern throughout the flight path.

20 Claims, 8 Drawing Sheets

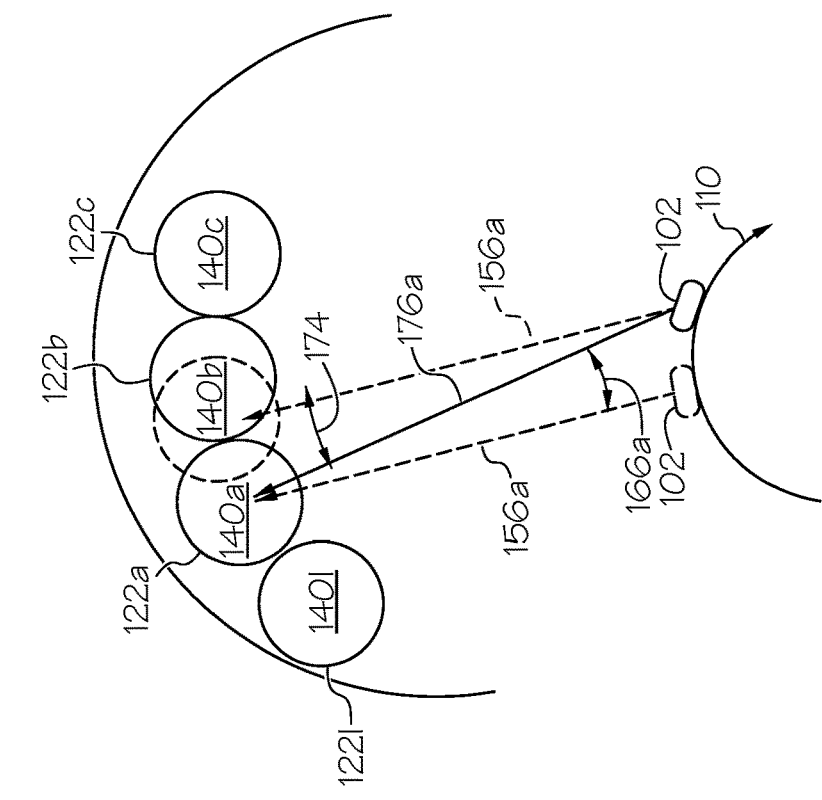
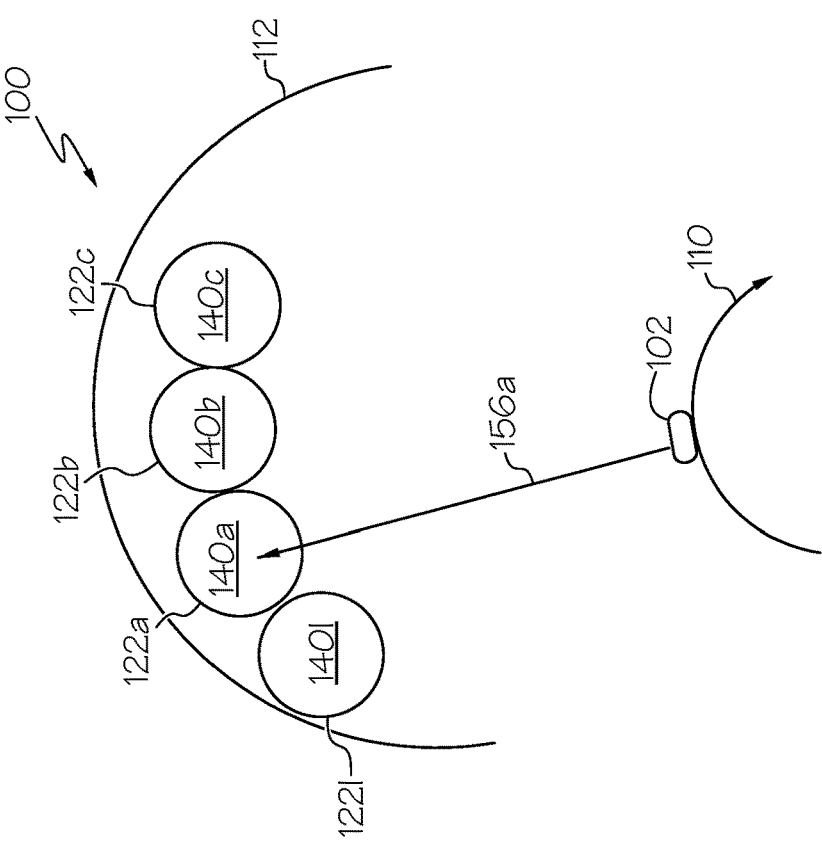

SYSTEM AND METHOD FOR MAINTAINING COMMUNICATIONS OVER A COVERAGE AREA

FIELD

The present disclosure is generally related to communications systems and, more particularly, to a system and method for maintaining communications coverage over a coverage area provided by a high altitude aerial platform.

BACKGROUND

Modern wireless communications systems depend on aerial communications platforms (e.g., a space or air vehicle) to route communications (e.g., transmit and receive information) between ground based base stations and user terminals. The aerial communications platform may employ a number of signal beams (e.g., spot beams) providing a beam pattern that forms a coverage area over a geographic region that may be divided into a plurality of service areas.

Because of the limit of frequency resources available for over-the-air transmission, various communications schemes may be used to provide a greater number of communication signals within an allocated frequency band. One example is the use of a high altitude platform system capable of employing smaller spot beams that increases the availability of frequency reuse.

Therefore, a reliable wireless communications system often depends on the accurate position control of the signal beams as the high altitude platform system moves along its travel path. An existing position control technique requires a gimbal mechanism that physically moves an antenna to maintain a beam pointing direction of the signal beam as the high altitude platform system moves along its travel path. However, the gimbal mechanism adds undesirable weight and complexity to the high altitude platform system. Further, the gimbal mechanism may lack the response speed and accuracy necessary to maintain the position of the signal beams.

Accordingly, those skilled in the art continue with research and development efforts in the field of wireless communications.

SUMMARY

In one example, the disclosed communications system includes radio frequency equipment configured to generate RF beams from a high altitude communications platform providing communications coverage over a coverage area, a beamformer configured to apply beam weights to the RF beams to divide the coverage area into service areas arranged in a frequency reuse ground pattern, and a processor configured to adjust the beam weights to compensate for beam displacements resulting from motion of the high altitude communications platform along a flight path, and interchange the RF beams to maintain the frequency reuse ground pattern throughout the flight path.

In another example, the disclosed high altitude communications platform includes an aerial platform, an antenna system carried by the aerial platform and configured to generate RF beams providing communications coverage over a coverage area, a beamformer coupled to the antenna system to apply beam weights to the RF beams to divide the coverage area into service areas arranged in a frequency reuse ground pattern, and a processor coupled to the beamformer to adjust the beam weights to compensate for beam displacements resulting from motion of the high altitude communications platform along a flight path, and interchange the RF beams to maintain the frequency reuse ground pattern throughout the flight path.

In yet another example, the disclosed method may include the steps of: (1) generating RF beams from a high altitude communications platform providing communications coverage over a coverage area, applying beam weights to the RF beams to divide the coverage area into service areas arranged in a frequency reuse ground pattern, adjusting the beam weights to compensate for beam displacements resulting from motion of the high altitude communications platform along a flight path, and interchanging the RF beams to maintain the frequency reuse ground pattern throughout the flight path.

Other examples of the disclosed system, apparatus and method will become apparent from the following detailed description, the accompanying drawings and the appended claims.

BRIEF DESCRIPTION OF THE DRAWINGS

FIG. 5 is a partial schematic illustrations of the communication system of FIG. 4;

FIG. 6 is a partial schematic illustration of the communication system at an intermediate time;

DETAILED DESCRIPTION

Figure 1:
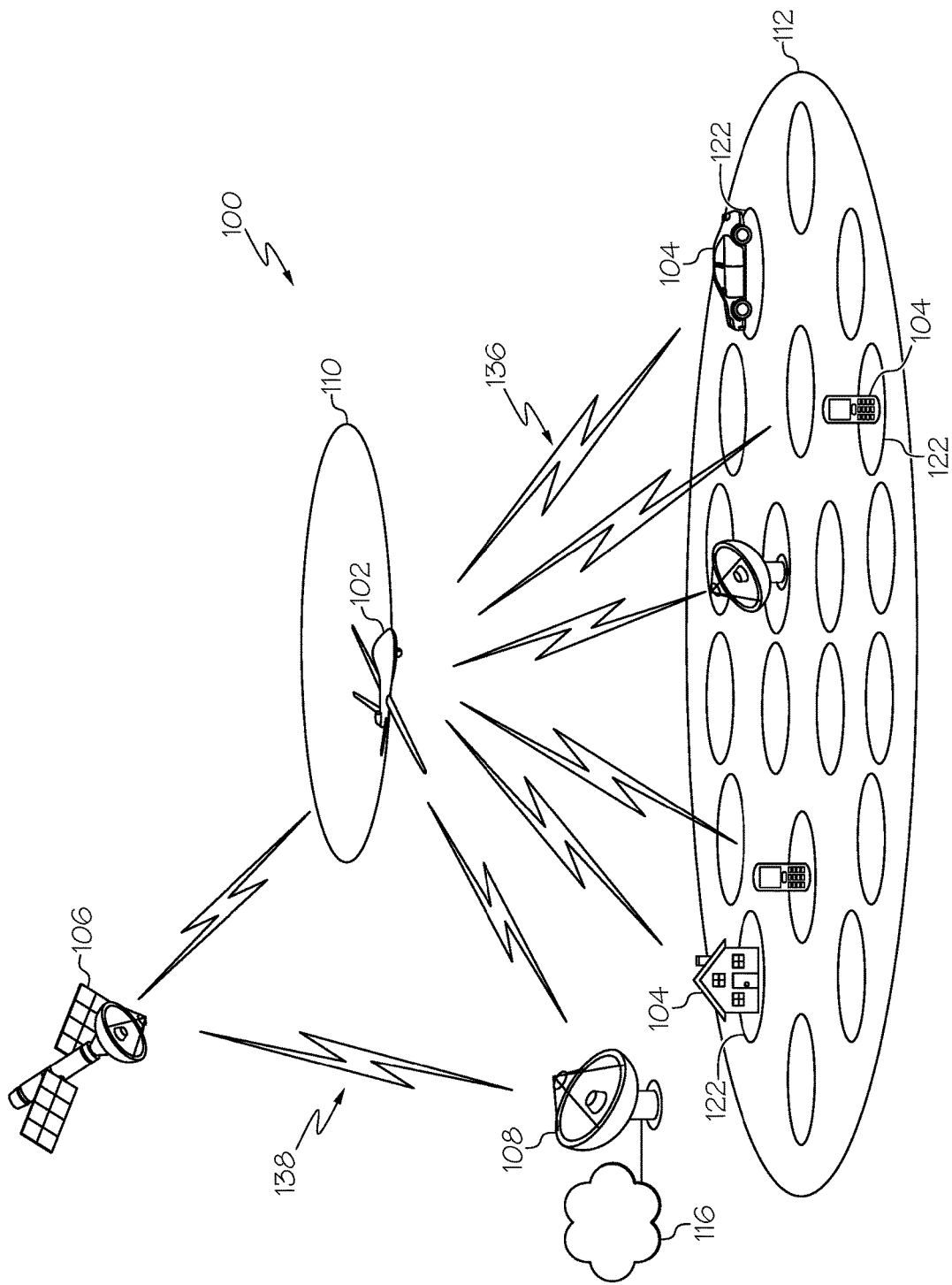
FIG. 1 is a schematic illustration of one example of the disclosed communications system.

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

Figure 2:
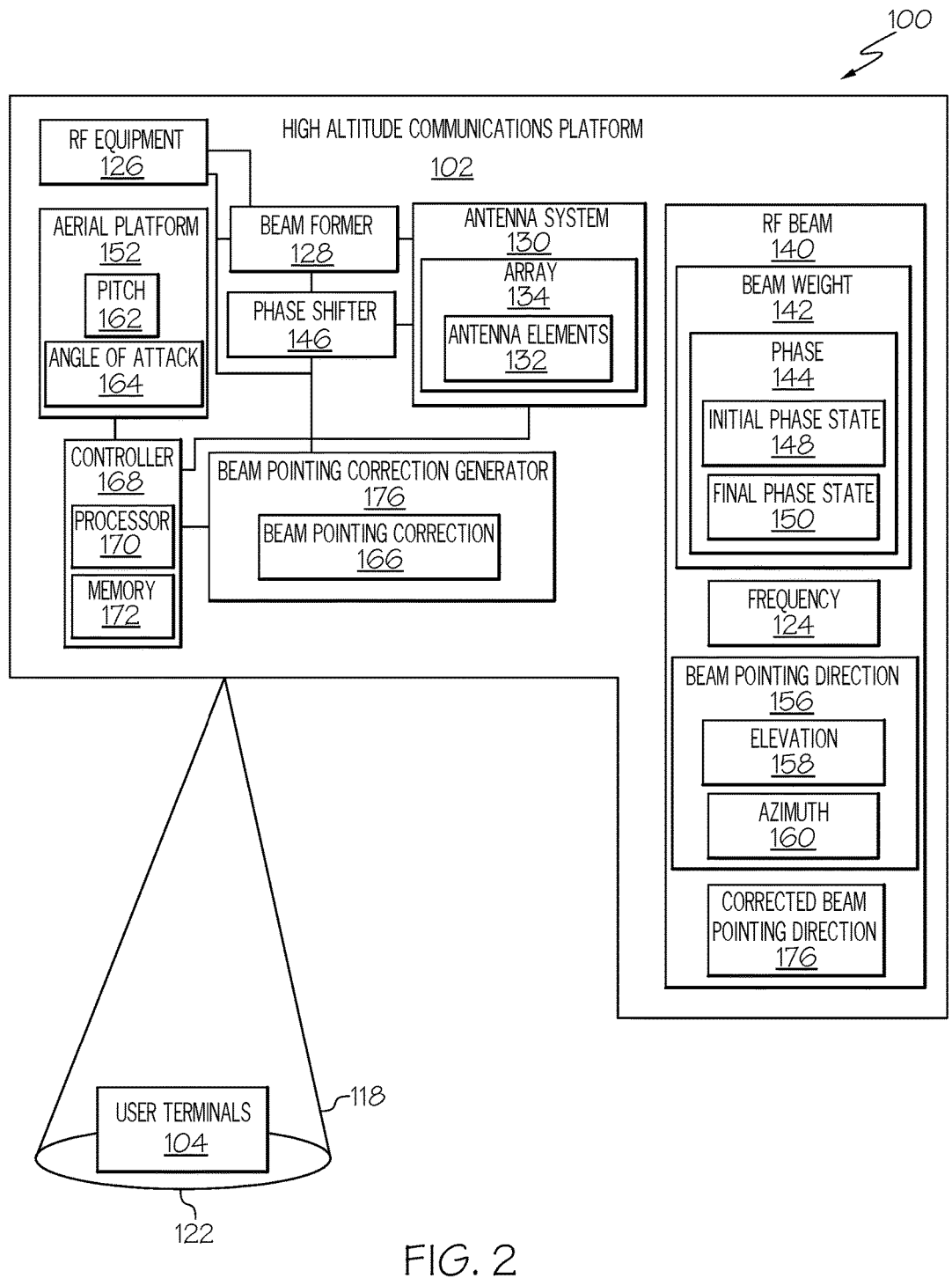
FIG. 2 is a schematic block diagram of one example of the communications system.
Figure 10:
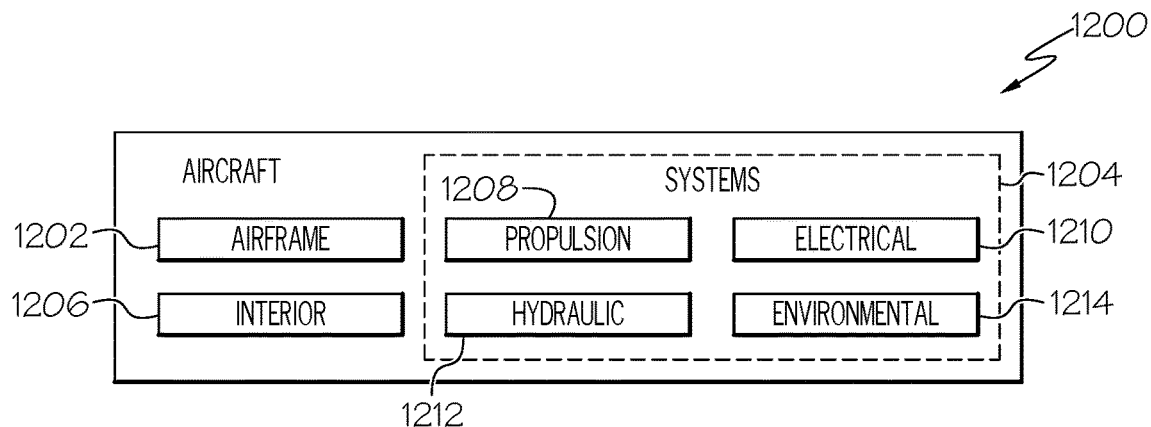
FIG. 10 is a schematic illustration of an aircraft.

In FIGS. 2 and 10, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 2 and 10 may be combined in various ways without the need to include other features described in FIGS. 2 and 10, other drawing figures, and/or the accompanying disclosure, even though such combination or combinations are not explicitly illustrated herein. Similarly, additional features not limited to the examples presented, may be combined with some or all of the features shown and described herein.

Figure 8:
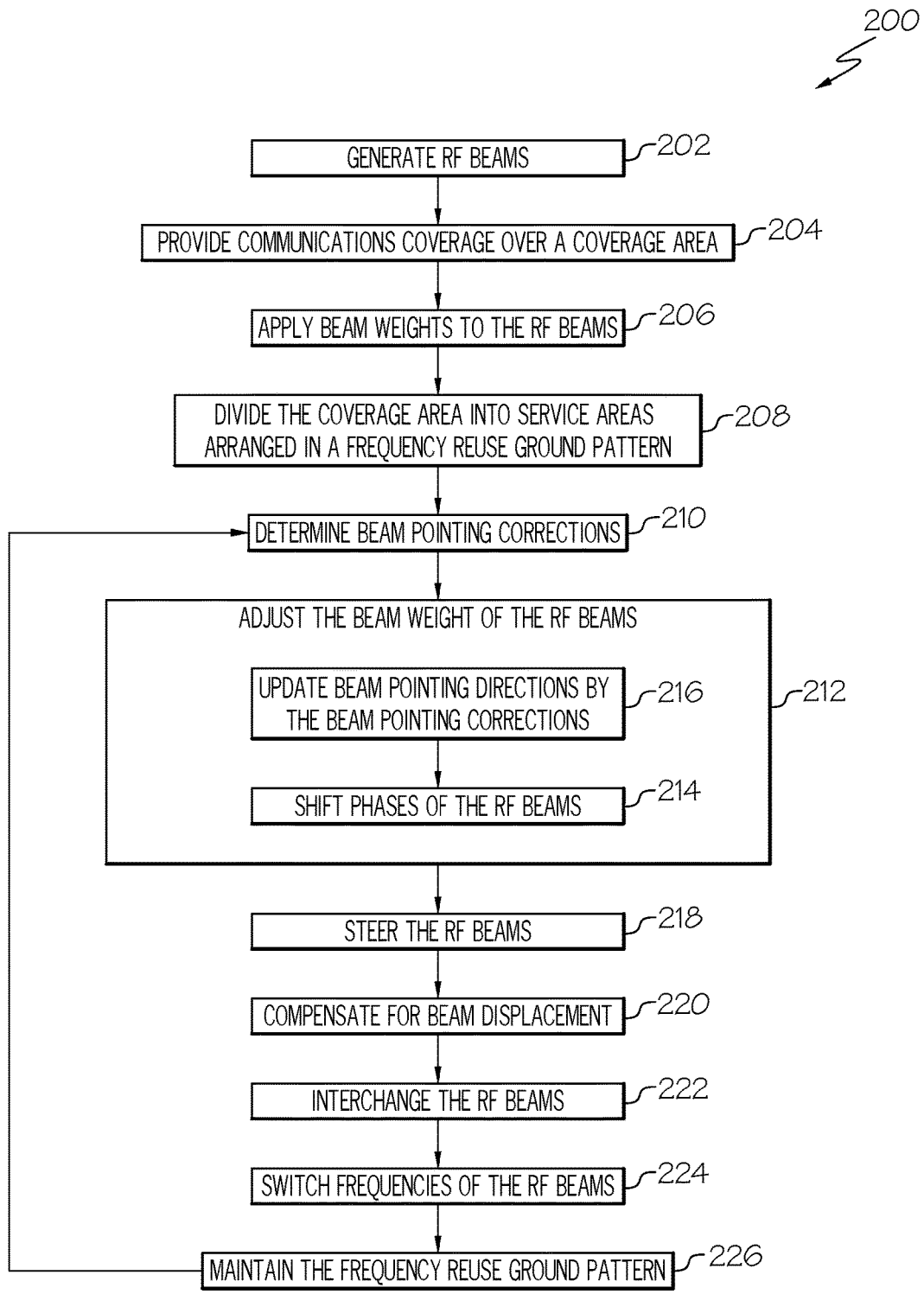
FIG. 8 is a flow diagram of one example of the disclosed method for maintaining communications over a coverage area.
Figure 9:
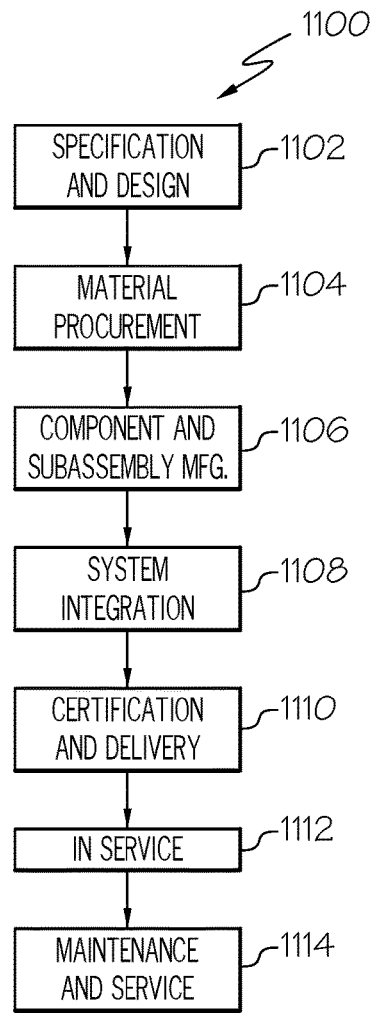
FIG. 9 is a block diagram of aircraft production and service methodology.

In FIGS. 8 and 9, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8 and 9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according the present disclosure are provided below.

Referring to FIG. 1, one example of a communications system 100 is disclosed. As one example, the communications system 100 may be a wireless communications system or network including a high altitude communications platform 102 and user terminals 104 (e.g., a plurality of user terminals). The system 100 also includes at least one of a satellite 106 and a ground base station 108. Although only one high altitude communications platform 102, satellite 106 and base station 108 are illustrated, in other examples, the system 100 may include more than one of each.

The high altitude communications platform 102 communicates with the user terminals 104 positioned on Earth (not explicitly illustrated). As one example, the high altitude communications platform 102 operates as a communications relay between one or more satellites 106 and the user terminals 104. As another example, the high altitude communications platform 102 operates as a relay between one or more base stations 108 and the user terminals 104.

The satellite 106 may be any object in any elliptical orbit and configured to transmit and/or receive communications to and from Earth. As one example, the satellite 106 may be in geostationary orbit. As another example, the satellite 106 may be geosynchronous orbit. As yet another example, the satellite 106 may be in Molniya orbit. In one example, the satellite 106 includes one or more transmitting and/or receiving antennas (not explicitly illustrated) used to communicate with the base station 108 and the high altitude communications platform 102. As one specific, non-limiting example, the satellite 106 may be a high-throughput satellite ("HTS") configured to transmit and/or receive radio waves covering a microwave frequency range between approximately 1.0 GHz and approximately 90 GHz.

While not explicitly illustrated, the satellite 106 may include or may be connected to a satellite controller that controls the communication of signals to and from the base station 108 and the high altitude communications platform 102. The satellite controller may include a processor, a storage device (e.g., a memory), an input device and/or a display. The satellite controller may be remotely located with or co-located with (e.g., integral to) the satellite 106.

In one example, the base station 108 (also commonly referred to as a ground station or teleport) includes one or more transmitting and/or receiving antennas (not explicitly illustrated) used to communicate with one of the satellite 106 or the high altitude communications platform 102. As general examples, the base station 108 may be one or more of audio, video and/or data service providers. As one example, base station 108 may be an Internet service provider. As another example, the base station 108 may be a telephone, voice and/or data service provider. As yet another example, the base station 108 may be a television, video and/or audio broadcaster.

The base station 108 may be coupled to or otherwise part of a terrestrial network 116. As one example, the network 116 may include a telecommunications network, such as the Internet. Thus, the base stations 108 may provide connectivity between the user terminals 104 and the network 116 through the high altitude communications platform 102 or the satellite 106 and the high altitude communications platform 102.

While not explicitly illustrated, the base station 108 may include or may be connected to a base station controller that controls the communication of signals to and from the satellite 106, the high altitude communications platform 102 and/or the network 116. The base station controller may include a processor, a storage device (e.g., a memory), an input device and/or a display. The base station controller may be remotely located with or co-located with (e.g., integral to) the base station 108.

The user terminals 104 may be of a variety of different types such as small-sized terminals (e.g., handheld terminals, mobile telephones, etc.), medium-sized terminals (e.g., portable terminals, vehicular terminals, etc.) and/or large-sized terminals (e.g., tower terminals, maritime terminals, etc.). The user terminals 104 include one or more transmitting and/or receiving antennas (not explicitly illustrated) used to communicate with the high altitude communications platform 102. As one example, the user terminals 104 may include any communications device used by an end user (e.g., an audio, video, or data communications device). Thus, the audio, video, and/or data service provider may service the user terminals 104 located within the service areas 122.

While not explicitly illustrated, each one of the user terminals 104 may include a user terminal controller that controls the communication of signals to and from the high altitude communications platform 102. The user terminal controller may include a processor, a storage device (e.g., a memory), an input device and/or a display. The use terminal controller may be integral to the user terminal 104.

The high altitude communications platform 102 may operate within a minimum altitude (e.g., approximately 12 km) and a maximum altitude (e.g., approximately 55 km). As one example, the high altitude communications platform 102 operates from a high, suborbital altitude (e.g., in the stratosphere). As another example, the high altitude communications platform 102 operates at an altitude of approximately 20 km.

The high altitude communications platform 102 may cover (e.g., provide communications coverage over) a coverage area 112. The coverage area 112 may be a geographic region, a metropolitan area, a market area and the like. The user terminals 104 may be located within the coverage area 112. The base station 108 may be located within or outside of the coverage area 112.

The high altitude communications platform 102 may be assigned to fly within a flight path 110 over the coverage area 112. As one example, the flight path 110 may be a circular or nearly circular path. As another example, the flight path 110 may be an elliptical path. As another example, the flight path 110 may be series of two intersecting or adjoining nearly circular or elliptical paths (e.g., a FIG. 8). As yet another example, the flight path 110 may be series of more than two intersecting or adjoining nearly circular or elliptical paths.

In various examples, the satellite 106, the base station 108 and the high altitude communications platform 102 may enable communication between the user terminals 104 and the network 116. In this regard, as one example, the base station 108 may receive information (e.g., data) from the network 116, and communicate the information to the satellite 106. The satellite 106 may in turn transmit or relay the information to the high altitude communications platform 102. The high altitude communications platform 102 may in turn transmit or relay the information to one or more of the user terminals 104 in spot beams 118 (FIG. 2). As another example, the base station 108 may receive information (e.g., data) from the network 116, and communicate the information directly to the high altitude communications platform 102. The high altitude communications platform 102 may in turn transmit or relay the information to one or more of the user terminals 104 in spot beams 118.

Conversely, as one example, the high altitude communications platform 102 may receive information from one or more of the user terminals 104, and communicate the information to the satellite 106. The satellite 106 may in turn transmit or relay the information to the base station 108, which may in turn transmit or relay the information to the network 116. As another example, the high altitude communications platform 102 may receive information from one or more of the user terminals 104, and communicate the information to the base station 108, which may in turn transmit or relay the information to the network 116.

The high altitude communications platform 102 may employ a number of spot beams 118 providing a frequency reuse ground pattern 120 (or beam laydown) that forms the coverage area 112. In one example, the spot beams 118 cover a respective service area 122 (or cell) of the communications network within the coverage area 112. As one example, each one of the service areas 122 may represent a footprint of the radiated spot beam 188 (FIG. 2) from the high altitude communications platform 102 to Earth's surface. Each one of the RF beams 140 (e.g., the spot beam 118) may include a predetermined signal strength (e.g., power) so that it will cover only a limited geographic area, represented by the service area 122. Each one of the spot beams 118 (also identified individually as a spot beam 118) may be assigned an operating frequency 124 within an allocated frequency band. As one example, the communication system 100 may provide a single layer of equally sized service areas 122 arranged in a single frequency reuse ground pattern for coverage over a particular geographic region (e.g., the coverage area 112).

Referring to FIG. 2, in one example, the communications system 100 includes radio frequency (RF) equipment 126 configured to enable communication between at least one of the satellite 106, the base station 108, the high altitude communications platform 102 and the user terminals 104. The RF equipment 126 may be configured to generate, transmit and/or receive radio frequency electromagnetic radiation in the form of beams (referred to herein collectively as RF beams 140). As one example, the RF equipment 126 may include the antenna systems of the high altitude communications platform 102, the satellite 106, the base station 108 and/or the user terminals 104. In one example, a portion of the RF equipment 126 may be included with (e.g., implemented onboard) the high altitude communications platform 102 to enable communication with the user terminals 104 and at least one of the satellite 106 and the base station 108.

As one example, the high altitude communications platform 102 includes an aerial platform 152 that carries an antenna system 130. The antenna system 130 may include an array 134 of antenna elements 132 (e.g., a plurality of antenna elements arranged in linear array or a planar array). As one example, the antenna system 130 may include a phased array or reflector. The antenna system 130 is configured to receive information from at least one of the base station 108 and the satellite 106 over a feed link 138 (e.g., an uplink) and transmit or relay the information to one or more of the user terminals 104 in the spot beam 118 over a user link 136 (e.g., a downlink). Conversely, the antenna system 130 is configured to receive information from one or more of the user terminals 104 over the user link 136 (e.g., an uplink) and transmit or relay the information to at least one of the base station 108 and the satellite 106 over the feed link 138 (e.g., a downlink).

As one example, the aerial platform 152 (e.g., the high altitude communications platform 102) may be an unmanned aerial vehicle ("UAV"). The aerial platform 152 may fly in the predetermined flight path 110 over a given geographic area on Earth. The aerial platform 152 may be capable of flying for long periods of time (e.g., for several months) at the operating altitude. As one example, the aerial platform 152 may be a solar-powered electric UAV.

In one example, the communications system 100 includes at least one beamformer 128 configured to apply (e.g., set and/or adjust) beam weights 142 (referred to herein individually as a beam weight 142) to the RF beams 140 (referred to herein individually as an RF beam 140). As one example, to partially facilitate directional transmission or reception of the RF beam 140 (e.g., as the spot beam 118), the beamformer 128 may be configured to apply amplitude, gain and/or a phase 144 to the RF beam 140. The beam weights 142 may be used to form the spot beams 118 corresponding to the service areas 122 forming the frequency reuse ground pattern 120 of the coverage area 112 (FIG. 1).

Generally, in the forward direction, signals from the network 116 (FIG. 1) may be sent to the beamformer 128. The beamformer 128 may apply the appropriate beam weight 142 to the signals, and then forward the signals to the user terminals 104 via the RF equipment 126. The beamformer 128 may be implemented onboard the high altitude communications platform 102, onboard the satellite 106 or at the base station 108. As one example, signals from the network 116 may be sent to the beamformer 128 implemented at the base station 108, which in turn are forwarded to the high altitude communications platform 102, either directly or via the satellite 106. As another example, signals from the network 116 may be sent to the beamformer 128 implemented onboard the high altitude communications platform 102, either directly or via the satellite 106. In either implementation, the high altitude communications platform 102 may then provide the signals (e.g., as RF beams 140) to the appropriate user terminals 104 located in the service areas 122 as the spot beam 118. Conversely, in the return direction, the beamformer 128 may receive the signals from the user terminals 104 via the RF equipment 126. The beamformer 128 may use the appropriate beam weight 142 to strengthen the user signals, which may then continue to the network 116 for processing and routing.

In one example, the communications system 100 includes a controller 168. As one example, the controller 168 may be one or more computers that each includes a processor 170 communicatively coupled to memory 172. Generally, the controller 168 operates under control of an operating system stored in the memory 172, and accepts inputs and commands and to perform communications functions. The operating system and the computer program may include instructions which, when read and executed by the processor 170, causes the controller 168 to perform the steps necessary to implement the disclosed method 200 utilizing the disclosed communication system 100. The computer program and/or the operating instructions may also be tangibly embodied in the memory 172 and/or other data communications devices, thereby making a computer program product or article of manufacture.

As one example, the controller 168 may be at least partially implemented onboard the high altitude communications platform 102. The controller 168 may be configured to control navigation and other flight operations of the aerial platform 152. The controller 168 may also be configured to control application and/or adjustment of the beam weights 142 to the RF beams 140. The controller 168 may also serve as a signal processor. The controller 168 (e.g., one or more of the processors 170) may be configured to determine the beam pointing corrections 166 (e.g., may serve as a beam pointing correction generator 178).

Figure 3:
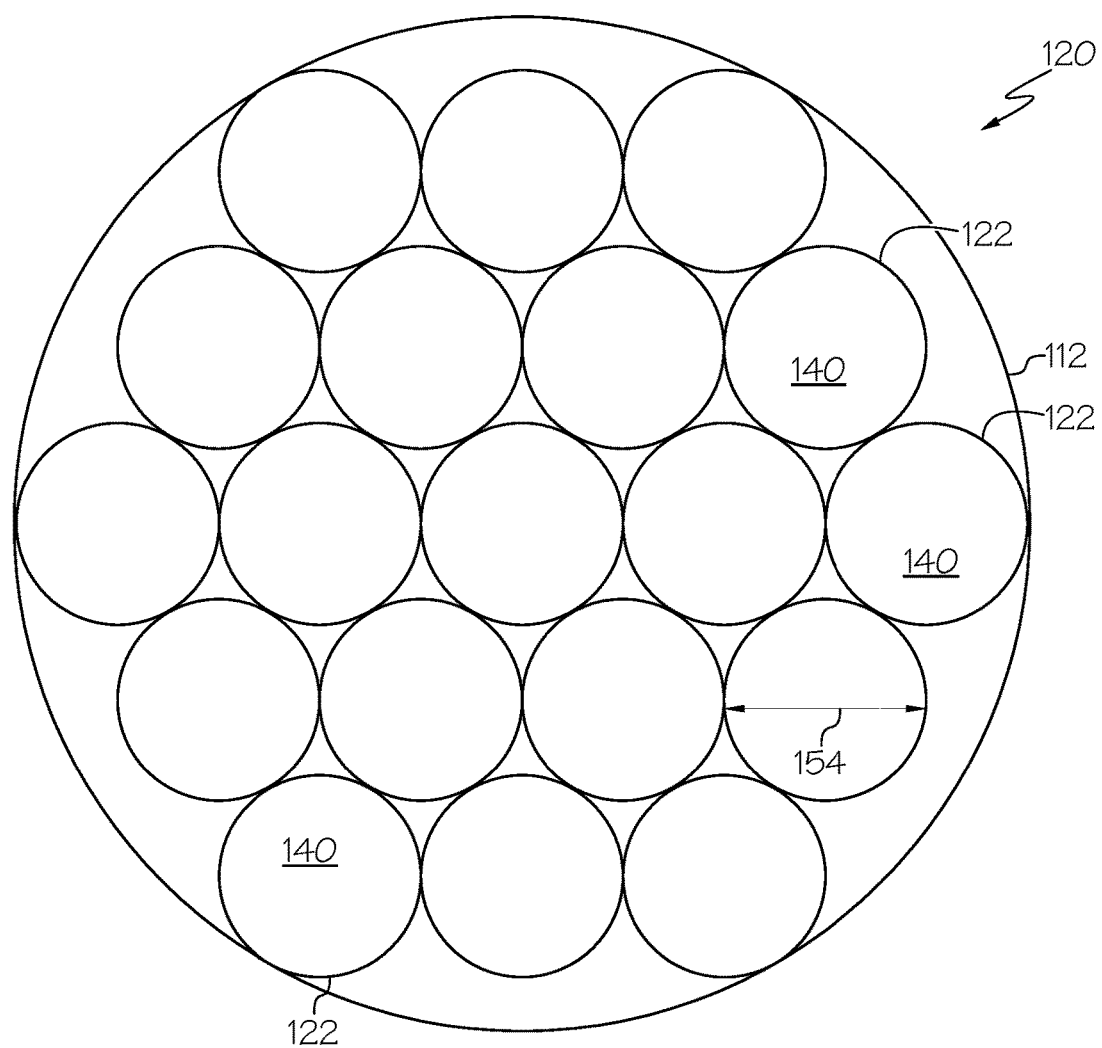
FIG. 3 is a schematic illustration of one example of a frequency reuse ground pattern.

Referring to FIG. 3, and with reference to FIG. 2, the communications system 100 (FIG. 2) may be configured to provide communications coverage over the coverage area 112. FIG. 3 illustrates one example of the coverage area 112 divided into the service areas 122 (e.g., a plurality of service areas). Only three of the service areas 122 are explicitly identified in FIG. 3. The service areas 122 are arranged in the frequency reuse ground pattern 120. Each one of the service areas 122 may be defined by an associated one of the RF beams 140 (e.g., the spot beam 118) (FIG. 2). As one example, and as illustrated in FIG. 3, each one of the RF beams 140 may include an approximately circular cross sectional shape. Each one of the RF beams 140 includes a beamwidth 154. As another example, each one of the RF beams 140 may include an approximately hexagonal cross sectional shape. Other cross sectional shapes of the RF beams 140 (e.g., the spot beams 118) are also contemplated.

In one example, and as illustrated in FIG. 3, the frequency reuse ground pattern 120 may be approximately circular. For example, a set of the service areas 122 (or cells) may be arranged in an approximately circular pattern. Multiple sets of the service areas 122 may be arranged in an approximately concentric circular pattern. Thus, as one example, and as illustrated in FIG. 3, the service areas 122 may define an approximately circular coverage area 112. Other shapes (e.g., hexagonal) of the frequency reuse ground pattern 120 and/or the coverage area 112 are also contemplated.

Figure 4:
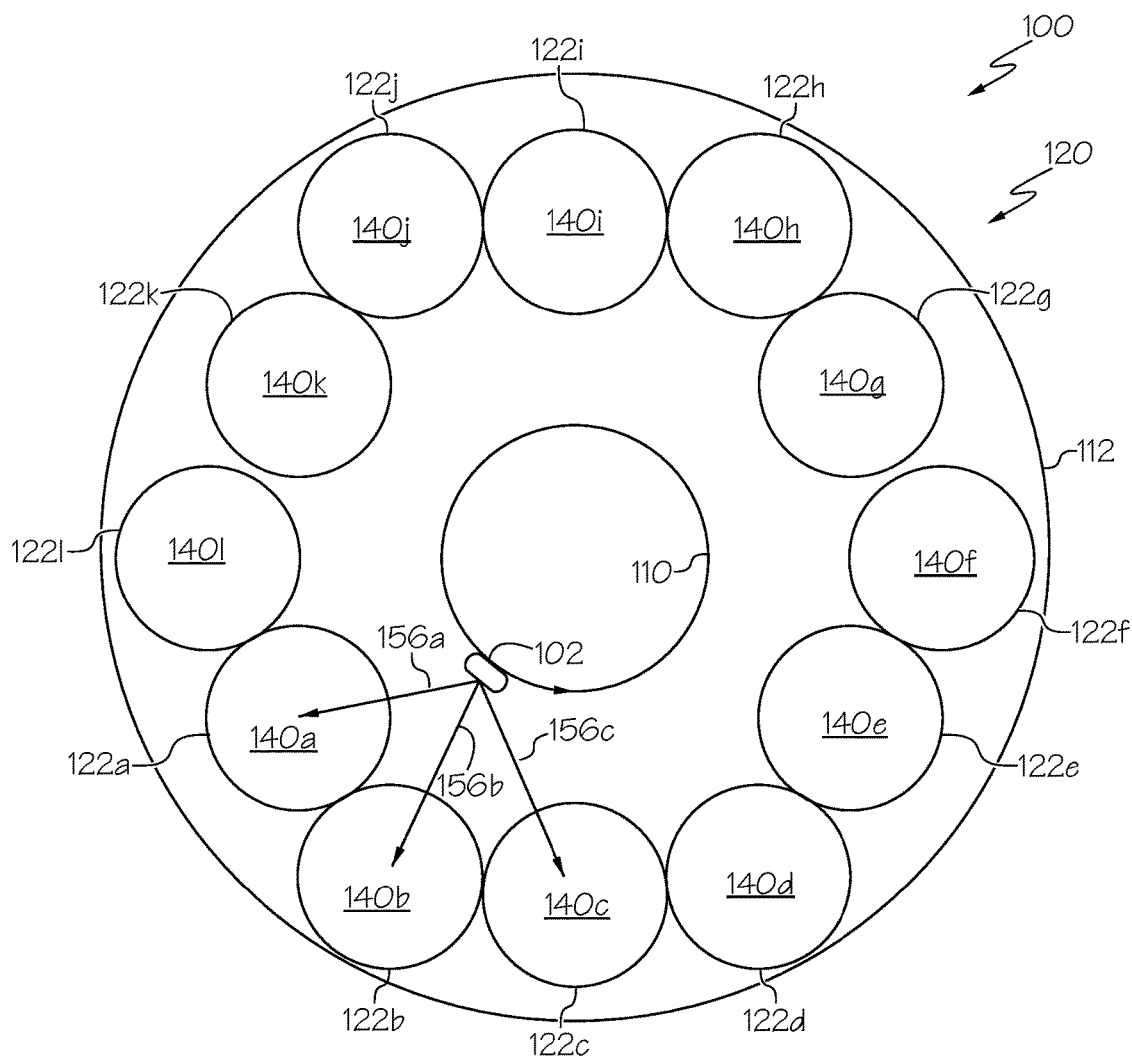
FIG. 4 is a schematic illustration of the communications system at a first time.

Referring to FIG. 4, and with reference to FIGS. 2 and 3, the communications system 100 generates and employs the RF beams 140 (e.g., a plurality of RF beams) directed to the service areas 122 from the high altitude communications platform 102. The beam weights 142 may be applied to the RF beams 140 to form the spot beams 118 (FIG. 2) associated with the service areas 122. Thus, the RF beams 140 (e.g., the spot beams 118) may divide the coverage area into the service areas 122 arranged in the frequency reuse ground pattern 120.

At each position along the flight path 110 or at each time throughout the flight path 110, the high altitude communications platform 102 includes at least one of a pitch 162 and an angle of attack 164 (FIG. 2). Similarly, at each position along the flight path 110 or at each time throughout the flight path 110, each one of the RF beams 140 includes a beam pointing direction 156. As one example, the beam pointing direction 156 is defined by at least one of an elevation 158 and an azimuth 160 (FIG. 2) of the RF beam 140 corresponding to the position (e.g., the pitch 162 and/or the angle of attack 164) of the high altitude communications platform 102 relative to the associated service area 122.

The beam pointing direction 156 may be oriented (or aimed) such that a center of the RF beam 140 (e.g., a center of the spot beam 118) (FIG. 2) is located at an approximate center of the service area 122 and an outer edge of the RF beam 140 defines a peripheral boundary of the service area 122.

At this point, the present disclosure recognizes and takes into account that if the high altitude communications platform 102 was maintained a generally stationary position relative to the service areas 122, that the beam pointing directions 156 of the RF beams 140 may not need to ever change. However, since the high altitude communications platform 102 is mobile and travels along the flight path 110, the RF beams 140 may move around the coverage area 112 in response to movement (e.g., a change in position) of the high altitude communications platform 102 along the flight path 110. Movement of the RF beams 140 may change the frequency reuse ground pattern 120 or may lead to increased system complexity or decreased reliability due to the increased signal handoff required as different RF beams 140 pass through each service area 122. Accordingly, some level of beam pointing direction adjustment (e.g., beam steering) of the RF beams 140 may be needed to control the position of the RF beams 140 in response to movement of the high altitude communications platform 102.

Referring to FIG. 2, and with reference to FIG. 1, in one example, the communications system 100 also includes at least one phase shifter 146 configured to shift the phase 144 of one or more of the RF beams 140 as the high altitude communications platform 102 travels along the flight path 110 (FIG. 1). As one example, to partially facilitate directional transmission or reception of the RF beam 140 (e.g., as the spot beam 118), the phase shifter 146 may be configured to shift the phase 144 of the RF beam 140 from an initial phase state 148 to a final phase state 150. Phase shifting the RF beams 140 may adjust the beam weight 142 of the RF beam 140 to maintain the RF beam 140 at a particular location on the ground corresponding to an associated service area 122 along at least a portion of the flight path 110.

Referring to FIG. 8, and with reference to FIGS. 1 and 2, one example of a method 200 is disclosed. Method 200 is one example implementation of a method for maintaining communications with the coverage area 112, for example, utilizing the disclosed communications system 100 (FIG. 1). Modifications, additions, or omissions may be made to method 200 without departing from the scope of the present disclosure. Method 200 may include more, fewer, or other steps. Additionally, steps may be performed in any suitable order.

In one example, the method 200 includes the steps of generating RF beams 140 from the high altitude communications platform 102 providing communications coverage over the coverage area 112, as shown at blocks 202 and 204.

In one example, the method 200 includes the steps of applying beam weights 142 to the RF beams 140 to divide the coverage area 112 into service areas 122 arranged in the frequency reuse ground pattern 120, as shown at blocks 206 and 208.

In one example, the method 200 includes the step of determining beam pointing corrections 166 along the flight path 110, as shown at block 210. As one example, the beam pointing corrections 166 may be determined by (e.g., based on) at least one of the pitch 162 and the angle of attack 164 of the high altitude communications platform 102 at various positions or times along the flight path 110.

In one example, the method 200 includes the steps of adjusting the beam weights 142 to compensate for beam displacements 174 resulting from motion of the high altitude communications platform 102 along the flight path 110, as shown at blocks 212 and 220.

In one example, adjusting the beam weights 142 continuously updates the beam pointing directions 156 of the RF beams 140 by the beam pointing corrections 16 to maintain the frequency reuse ground pattern throughout a portion of the flight path 110, as shown at block 216.

In one example, adjusting the beam weights 142 includes shifting the phases 144 of the RF beams 140 from the initial phase state 148 to the final phase state 150 to steer the RF beams 140 by a total beam pointing correction representing a maximum beam displacement, as shown at blocks 214 and 218. As one example, the maximum beam displacement is approximately one beamwidth 154.

In one example, the method 200 continues to compensate for the beam displacements 174 and interchange RF beams 140 as the high altitude communications platform 102 travels along the flight path 110. The phases 144 of the RF beams 140 are shifted back to the initial phase state 148 when the RF beams 140 are interchanged.

In one example, the method 200 includes the steps of interchanging the RF beams 140 to maintain the frequency reuse ground pattern 120 throughout the flight path 110, as shown at 222 and 226. In one example, interchanging the RF beams 140 occurs at the final phase state 150.

Figure 7:
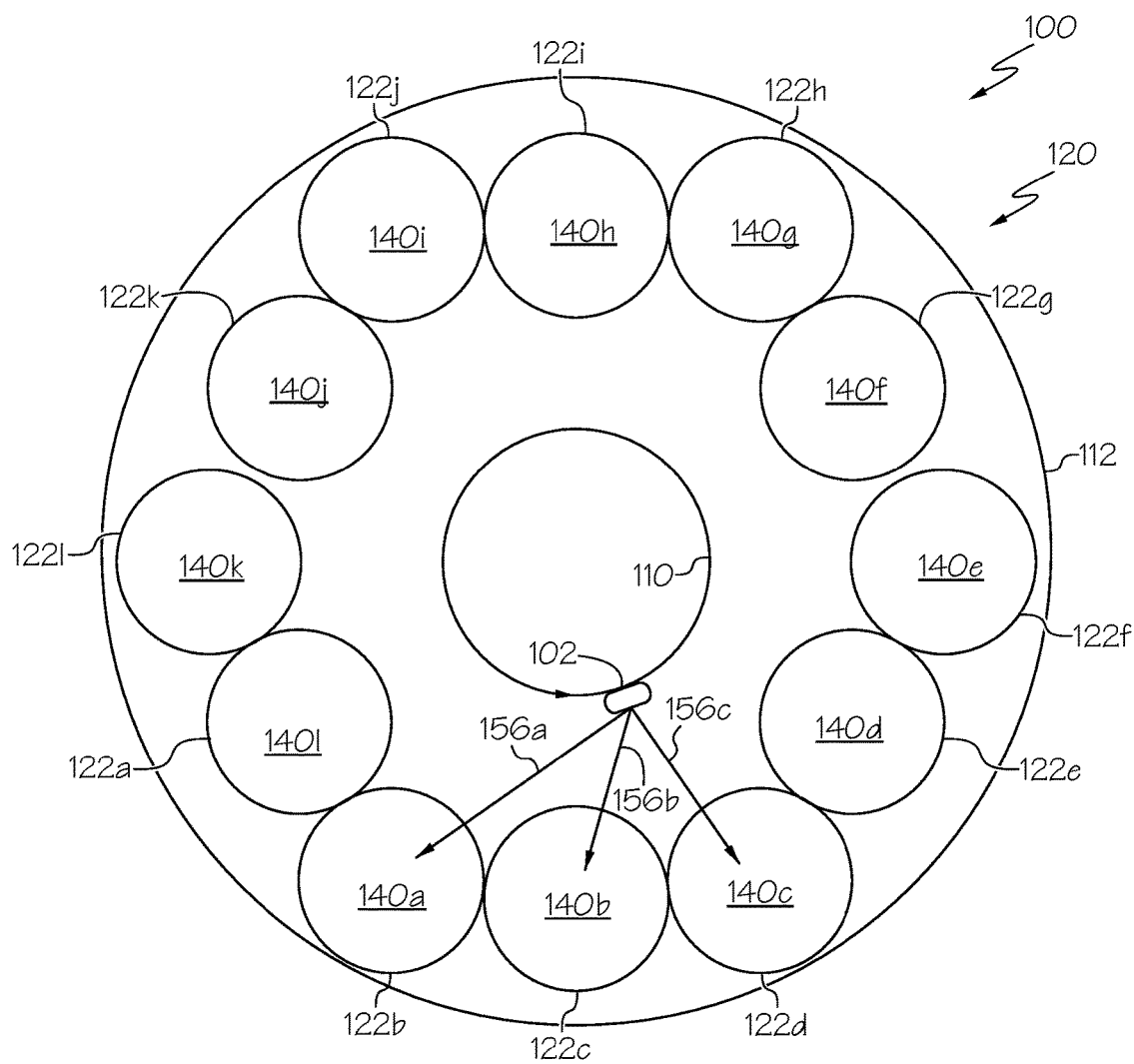
FIG. 7 is a schematic illustration of the communication system at a second time.

Referring to FIGS. 4 and 7, and with reference to FIGS. 2 and 3, in one example, at each position or time along the flight path 110 of the high altitude communications platform 102, each one of the RF beams 140 (FIG. 2) has an associated beam pointing direction 156 corresponding to an associated one of the service areas 122. As one example implementation of the disclosed communications system 100 and method 200, and as illustrated in FIG. 4, with the high altitude communications platform 102 at a first position P1 (or first time T1) along the flight path 110, each one of the RF beams 140, identified individually as RF beams 140a-140l, has an associated beam pointing direction 156, identified individually as beam pointing directions 156a-156c (only three beam pointing directions 156a, 156b, 156c are illustrated) corresponding to an associated one of the service areas 122, identified individually as service areas 122a-122l.

Referring to FIG. 4, and with reference to FIGS. 2 and 8, as one example, and as illustrated in FIG. 4, at the first position P1 (or first time T1) a first beam pointing direction 156a directs a first RF beam 140a to a first service area 122a, a second beam pointing direction 156b directs a second RF beam 140b to a second service area 122b, a third beam pointing direction 156c directs a third RF beam 140c to a third service area 122c, etc. Accordingly, FIG. 4 illustrates one example implantation of the method steps (FIG. 8) of generating the RF beams 140 from the high altitude communications platform 102 (block 202), providing communications coverage over the coverage area 112 (block 204), applying the beam weights 142 to the RF beams 140 (block 206), and dividing the coverage area 112 into the service areas 122 arranged in the frequency reuse ground pattern 120 (block 208).

Referring to FIGS. 5 and 6, and with reference to FIG. 2, in one example, as the high altitude communications platform 102 travels along the flight path 110 from the first position P1 (of first time T1) (FIG. 4) to a second position P2 (or second time T2) (FIG. 7), the beam pointing directions 156 are continuously adjusted by the beam pointing corrections 166 to generate corrected beam pointing directions 176 and maintain the RF beams 140 directed at the service areas 122 associated at the first position P1 (of first time T1).

As one example, and as illustrated in FIG. 5, with the high altitude communications platform 102 at the first position P1 (or first time T1), the first beam pointing direction 156a directs the first RF beam 140a to the first service area 122a. At this point, the phase 144 of the first RF beam 140a is set at the initial phase state 148 (FIG. 2), for example, an initial beam weight 142 is applied to the first RF beam 140a.

As illustrated in FIG. 6, as one example, with the high altitude communications platform 102 at an intermediate position, for example, between the first position P1 (or first time T1) (e.g., FIG. 4) and the second position P2 (or second time T2) (e.g., FIG. 7), the first beam pointing direction 156a is updated by a first beam pointing correction 166a to generate a first corrected beam pointing direction 176a and maintain the first RF beam 140a directed at the first service areas 122 throughout this portion of the flight path 110. At this point, the phase 144 of the first RF beam 140a is being shifted from the initial phase state 148 toward the final phase state 150 (FIG. 2), for example, the beam weight 142 of the first RF beam 140a is being adjusted to steer the first RF beam 140a.

As illustrated by broken lines in FIG. 6, without application of the first beam pointing correction 166a to the first beam pointing direction 156a to generate the first corrected beam pointing direction 176a, the first RF beam 140a would have been displaced (e.g., by the beam displacement 174) and would be directed partially at the first service area 122a and partially at the second service area 122b. Thus, the beam pointing correction 166 may be sufficient to counteract the beam displacement 174.

While not explicitly illustrated, the beam pointing directions 156 for all of the RF beams 140 (e.g., RF beams 140a-140l) are continuously adjusted by the beam pointing corrections 166 to generate the corrected beam pointing directions 176 and maintain the RF beams 140 directed at the service areas 122 (e.g., service areas 122a-122l) associated at the first position P1 (of first time T1). Accordingly, FIGS. 5 and 6 illustrate one example implementation of the method steps (FIG. 8) of determining the beam pointing corrections 166 along the flight path 110, adjusting the beam weights 142 (block 212), updating beam pointing directions 156 of the RF beams 140 by the beam pointing corrections 166 (block 216), shifting the phases 144 of the RF beams 140 from the initial phase state 148 toward the final phase state 150 (block 214), steering the RF beams 140 (block 218), compensating for beam displacements 174 resulting from motion of the high altitude communications platform 102 along the flight path 110 (block 220), and maintaining the frequency reuse ground pattern 120 throughout a portion of the flight path 110b.

Referring to FIG. 7, and with reference to FIGS. 2 and 8, as one example implementation of the disclosed communications system 100 and method 200, and as illustrated in FIG. 7, with the high altitude communications platform 102 at a second position P2 (or second time T2) along the flight path 110, each one of the RF beams 140, identified individually as RF beams 140a-140l, has an associated beam pointing direction 156, identified individually as beam pointing directions 156a-156c (only three beam pointing directions 156a, 156b, 156c are illustrated) corresponding to a different associated one of the service areas 122, identified individually as service areas 122a-122l. As illustrated, the RF beams 140 have been interchanged to be associated with different service areas 122 once a total beam pointing correction 166 represents a maximum beam displacement 174. As one example, the maximum beam displacement may be approximately one beamwidth 154 (of the RF beam 140).

Referring to FIG. 7, and with reference to FIGS. 2 and 8, as one example, and as illustrated in FIG. 7, at the second position P2 (or second time T2) the first pointing direction 156a directs the first RF beam 140a to the second service area 122b, the second beam pointing direction 156b directs the second RF beam 140b to the third service area 122c, the third beam pointing direction 156c directs the third RF beam 140c to a fourth service area 122d, etc. Interchanging the RF beams 140 occurs when the phases 144 of the RF beams 140 have been shifted by a maximum phase shift corresponding to maximum beam displacement 174 (e.g., phase shifted to the final phase state 150 equivalent to one beamwidth 154). The phases 144 of the RF beams 140 are returned to the initial phase state 148 so that the operation can be repeated for another portion of the flight path 110. Accordingly, FIG. 7 illustrates one example implementation of the method steps (FIG. 8) of interchanging the RF beams 140 (block 222) and maintaining the frequency reuse ground pattern 120 throughout the flight path 110 (block 226).

Referring to FIGS. 4-7, in other words, each one of the RF beams 140 is electronically steered (e.g., each one of the beam pointing directions 156 are adjusted), by adjusting the beam weights 142 (e.g., shifting the phases 144) to compensate for the beam displacement 174 equal to approximately one beamwidth 154, at which point each one of the RF beams 140 is redirected to an immediately adjacent one of the service areas 122 and is replaced by an immediately adjacent one of the RF beams 140. This operation is repeated numerous times along the flight path 110 such that the frequency reuse ground pattern 120 remains the same throughout the entire flight path 110.

Optionally, the frequency 124 of each one of the RF beams 140 may be switched upon the RF beams 140 being interchanged. As one example, at the first position P1 (of first time T1) (FIG. 4), the first RF beam 140a may use a first frequency associated with the first service area 122a and the second RF beam 140b may use a second frequency (different from the first frequency) associated with the second service area 122b. When the second RF beam 140b is replaced by the first RF beam 140a, the frequency 124 of the first RF beam 140a may be switched to use the second frequency associated with the second service area 122b.

Examples of the communications system 100, the high altitude communications platform 102 and the method 200 disclosed herein may be described in the context of an aircraft manufacturing and service method 1100 as shown in FIG. 9 and an aircraft 1200 as shown in FIG. 10. The aircraft 1200 may be one example of the aerial platform 152 of the high altitude communications platform 102.

During pre-production, the illustrative method 1100 may include specification and design, as shown at block 1102, of aircraft 1200, which may include design of the high altitude communications platform 102 (e.g., the aerial platform 152), the RF equipment 126, the antenna system 130, the beamformer 128, and/or the phase shifters 146, and material procurement, as shown at block 1104. During production, component and subassembly manufacturing, as shown at block 1106, and system integration, as shown at block 1108, of aircraft 1200 may take place. The high altitude communications platform 102 (e.g., the aerial platform 152), the RF equipment 126, the antenna system 130, the beamformer 128, and/or the phase shifters 146 as described herein may be incorporated as a portion of the production, component and subassembly manufacturing step (block 1106) and/or as a portion of the system integration (block 1108). Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1200 produced by illustrative method 1100 may include an airframe 1202, a plurality of high-level systems 1204 and an interior 1206. Examples of high-level systems 1204 include one or more of propulsion system 1208, electrical system 1210, hydraulic system 1212 and environmental system 1214. Any number of other systems may be included.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while aircraft 1200 is in service (block 1112) and during maintenance and service stage (block 1114).

Although various examples of the disclosed communications system, high altitude communications platform and communications method have been shown and described, modifications may occur to those skilled in the art upon reading the specification. The present application includes such modifications and is limited only by the scope of the claims.

What is claimed is:

1. A communications system comprising:
   radio frequency equipment configured to generate RF beams from a high altitude communications platform providing communications coverage over a coverage area;
   a beamformer configured to apply beam weights to said RF beams to divide said coverage area into service areas arranged in a frequency reuse ground pattern; and
   a processor configured to:
   adjust said beam weights to compensate for beam displacements resulting from said high altitude communications platform travelling from a first position to a second position along a flight path of said high altitude communications platform to hold said RF beams at said service areas; and
   when said high altitude communications platform is at said second position, replace each one of said RF beams with an adjacent one of said RF beams at each one of said service areas to maintain said frequency reuse ground pattern throughout said flight path.

2. The communications system of claim 1 wherein said processor is further configured to determine beam pointing corrections along said flight path, and wherein beam pointing directions of said RF beams are updated by said beam pointing corrections to maintain said frequency reuse ground pattern throughout a portion of said flight path.

3. The communications system of claim 1 further comprising a phase shifter configured to shift phases of said RF beams from an initial phase state to a final phase state and steer said RF beams by a total beam pointing correction representing a maximum beam displacement.

4. The communications system of claim 3 wherein said maximum beam displacement is approximately one beamwidth.

5. The communications system of claim 3 wherein said phase shifter is further configured to shift said phases back to said initial phase state when said RF beams are replaced.

6. The communications system of claim 1 wherein said processor is further configured to switch a frequency of said RF beams when said RF beams are replaced.

7. The communications system of claim 1 wherein:
   said RF beams comprise at least a first RF beam and a second RF beam,
   said first RF beam has a first beam pointing direction directed at a first service area when said high altitude communications platform is at said first position along said flight path,
   said second RF beam has a second beam pointing direction directed at a second service area,
   said processor adjusts a beam weight of said first RF beam by shifting a phase of said first RF beam to compensate for a beam displacement of said first RF beam in response to said high altitude communications moving to said second position along said flight path, and
   said second RF beam is replaced by said first RF beam having said first beam pointing direction directed at said second service area when said beam displacement is equal to approximately one beamwidth.

8. A high altitude communications platform comprising:
   an aerial platform;
   an antenna system carried by said aerial platform to generate RF beams providing communications coverage over a coverage area;
   a beamformer coupled to said antenna system to apply beam weights to said RF beams to divide said coverage area into service areas arranged in a frequency reuse ground pattern; and
   a processor coupled to said beam former and configured to:
   adjust said beam weights to compensate for beam displacements resulting from said high altitude communications platform travelling from a first position to a second position along a flight path of said high altitude communications platform to hold said RF beams at said service areas; and when said high altitude communications platform is at said second position, replace each one of said RF beams with an adjacent one of said RF beams at each one of said service areas to maintain said frequency reuse ground pattern throughout said flight path.

9. The high altitude communications platform of claim 8 wherein said processor determines beam pointing corrections along said flight path, and wherein beam pointing directions of said RF beams are updated by said beam pointing corrections to maintain said frequency reuse ground pattern throughout a portion of said flight path.

10. The high altitude communications platform of claim 8 further comprising a phase shifter coupled to said antenna system to shift phases of said RF beams from an initial phase state to a final phase state and steer said RF beams by a total beam pointing correction representing a maximum beam displacement.

11. The high altitude communications platform of claim 10 wherein said maximum beam displacement is approximately one beamwidth.

12. The high altitude communications platform of claim 10 wherein said phase shifter shifts said phases back to said initial phase state when said RF beams are replaced.

13. The high altitude communications platform of claim 8 wherein:
said RF beams comprise at least a first RF beam and a second RF beam,
said first RF beam has a first beam pointing direction directed at a first service area when said high altitude communications platform is at said first position along said flight path,
said second RF beam has a second beam pointing direction directed at a second service area,
said processor adjusts a beam weight of said first RF beam by shifting a phase of said first RF beam to compensate for a beam displacement of said first RF beam in response to said high altitude communications moving to said second position along said flight path, and
said second RF beam is replaced by said first RF beam having said first beam pointing direction directed at said second service area when said beam displacement is equal to approximately one beamwidth.

14. A method comprising:
generating RF beams from a high altitude communications platform providing communications coverage over a coverage area;
applying beam weights to said RF beams to divide said coverage area into service areas arranged in a frequency reuse ground pattern;
adjusting said beam weights to compensate for beam displacements resulting from said high altitude communications platform travelling from a first position to a second position along a flight path of said high altitude communications platform to hold said RF beams at said service areas; and
when said high altitude communications platform is at said second position, replacing each one of said RF beams with an adjacent one of said RF beams at each one of said service areas to maintain said frequency reuse ground pattern throughout said flight path.

15. The method of claim 14 further comprising determining beam pointing corrections along said flight path, wherein adjusting said beam weights updates beam pointing directions of said RF beams by said beam pointing corrections to maintain said frequency reuse ground pattern throughout a portion of said flight path.

16. The method of claim 14 wherein:
adjusting said beam weights comprises shifting phases of said RF beams from an initial phase state to a final phase state to steer said RF beams by a total beam pointing correction representing a maximum beam displacement, and
replacing said RF beams occurs at said final phase state.

17. The method of claim 16 wherein said maximum beam displacement is approximately one beamwidth.

18. The method of claim 16 further comprising shifting said phases back to said initial phase state when said RF beams are replaced.

19. The method of claim 14 further comprising switching a frequency of said RF beams when said RF beams are replaced.

20. The method of claim 14 wherein:
said RF beams comprise at least a first RF beam and a second RF beam,
said first RF beam has a first beam pointing direction directed at a first service area when said high altitude communications platform is at said first position along said flight path,
said second RF beam has a second beam pointing direction directed at a second service area,
adjusting said beam weights comprises adjusting a beam weight of said first RF beam by shifting a phase of said first RF beam to compensate for a beam displacement of said first RF beam in response to said high altitude communications moving to said second position along said flight path, and
interchanging said RF beams comprises replacing said second RF beam by said first RF beam having said first beam pointing direction directed at said second service area when said beam displacement is equal to approximately one beamwidth.

* * * * *